US008724486B2

(12) United States Patent  
Seto et al.

(10) Patent No.: US 8,724,486 B2  
(45) Date of Patent: May 13, 2014

(54) SYSTEM AND METHOD FOR HEARTBEAT SIGNAL GENERATION

(75) Inventors: Nelson Seto, Nashua, NH (US); Peter Monnes, Chelmsford, MA (US); Thomas A. Hengeveld, Hollis, NH (US)

(73) Assignee: Pine Valley Investments, Inc., Las Vegas, NV (US)

( * ) Notice: Subject to any disclaimer, the term of this patent is extended or adjusted under 35 U.S.C. 154(b) by 825 days.

(21) Appl. No.: 12/431,606

(22) Filed: Apr. 28, 2009

(65) Prior Publication Data

US 2009/0274058 A1 Nov. 5, 2009

Related U.S. Application Data

(60) Provisional application No. 61/050,104, filed on May 2, 2008.

(51) Int. Cl.  
*G01R 31/08* (2006.01)  
*H04W 4/00* (2009.01)

(52) U.S. Cl.  
USPC ............................. 370/252; 370/256; 370/338

(58) Field of Classification Search  
USPC ......................................... 370/338, 252–256  
See application file for complete search history.

(56) References Cited

U.S. PATENT DOCUMENTS

| | | | |
|---|---|---|---|
| 2003/0128690 A1* | 7/2003 | Elliott et al. | 370/351 |
| 2004/0042434 A1 | 3/2004 | Kennedy | 370/338 |
| 2006/0034330 A1* | 2/2006 | Iwamura | 370/468 |
| 2006/0098606 A1* | 5/2006 | Pandey et al. | 370/338 |
| 2006/0101026 A1* | 5/2006 | Fukushima | 707/100 |
| 2006/0133360 A1* | 6/2006 | Veschi | 370/352 |
| 2006/0146863 A1* | 7/2006 | Spinar et al. | 370/449 |
| 2007/0112954 A1 | 5/2007 | Ramani | 709/227 |
| 2007/0180119 A1* | 8/2007 | Khivesara et al. | 709/226 |
| 2008/0069006 A1* | 3/2008 | Walter et al. | 370/252 |
| 2008/0076447 A1 | 3/2008 | Duxbury et al. | 455/456.1 |
| 2008/0112364 A1* | 5/2008 | Kwon et al. | 370/331 |
| 2008/0130656 A1* | 6/2008 | Kim et al. | 370/395.21 |
| 2009/0028170 A1* | 1/2009 | Jiang et al. | 370/406 |

FOREIGN PATENT DOCUMENTS

| | | |
|---|---|---|
| JP | 2006101428 | 4/2006 |
| JP | 2008048454 | 2/2008 |
| WO | 0192992 | 12/2001 |

* cited by examiner

*Primary Examiner* — Brandon Renner  
(74) *Attorney, Agent, or Firm* — Allen, Dyer, Doppelt, Milbrath & Gilchrist, P.A.

(57) ABSTRACT

A system and method for heartbeat signal generation are provided. The method includes determining a communication condition and generating heartbeat signals based on the determined communication condition. The system includes a plurality of communication cells and at least one communication device configured to generate heartbeat signals. A rate of generating the heartbeat signals is based on one of (i) a service priority or user group and (ii) communication requirements for a network type for each of the plurality of communication cells.

25 Claims, 4 Drawing Sheets

Readiness Levels:

SYSTEM AND METHOD FOR HEARTBEAT SIGNAL GENERATION

CROSS REFERENCE TO RELATED APPLICATIONS

This application claims priority to and the benefit of the filing date of U.S. Provisional Application No. 61/050,104 entitled "System and Method for Heartbeat Signal Generation", filed on May 2, 2008 and which is hereby incorporated by reference in its entirety.

BACKGROUND OF THE INVENTION

The subject matter disclosed herein relates generally to wireless communication systems, and more particularly, to generating heartbeat signals within wireless communication systems.

In wireless communication systems, for example, cellular communication networks, a plurality of communication channels are provided for communicating information between communication devices. Each of the communication channels provide a certain amount of bandwidth that may be shared by multiple communication devices. In order to communicate on a particular channel a device establishes a link using the channel. Continued access to the channel by the device requires that the device indicate to the network that the device is still using the channel. If the network does not receive an indication from the device that the device is still accessing the channel, the system will end the connection. Thus, in certain networks the device sends a heartbeat signal to maintain connection to a channel.

In some wireless networks, such as in a General Packet Radio Service (GPRS) network, different connections are available. For example, a circuit switched connection is available between two end-points in the network, such as between two communication devices. A packet data connection for communicating cellular digital packet data is also available. These different connections may provide different latency. In order to maintain the packet data connection, heartbeat signals must be transmitted by a device using the packet data connection. If heartbeat signals are not sent at predetermined time periods of nonuse of the packet data connection (as determined by the network), the connection can timeout and the device can lose the packet data connection (because the connection is shared). Access to the packet data connection may be regained, but typically only after a time period, thereby adding latency to the communication.

Thus, heartbeat signals between devices and the system are required to maintain a system's data link connection with the devices. The frequency of the required heartbeat signals is a system setting. Known systems for setting heartbeat signal requirements and methods for generating heartbeat signals are typically static and inflexible, which results in an inefficient use of system resources.

BRIEF DESCRIPTION OF THE INVENTION

In accordance with various embodiments, a method for generating heartbeat signals is provided. The method includes determining a communication condition and generating heartbeat signals based on the determined communication condition.

In accordance with other various embodiments, a method for generating heartbeat signals is provided. The method includes determining heartbeat generation rates for different communication requirements and generating heartbeat signals at a rate corresponding to a current communication requirement.

In accordance with yet other various embodiments, a cellular communication system is provided that includes a plurality of communication cells and at least one communication device configured to generate heartbeat signals. A rate of generating the heartbeat signals is based on one of (i) a service priority or user group and (ii) communication requirements for a network type for each of the plurality of communication cells.

DETAILED DESCRIPTION OF THE INVENTION

Figure 1:
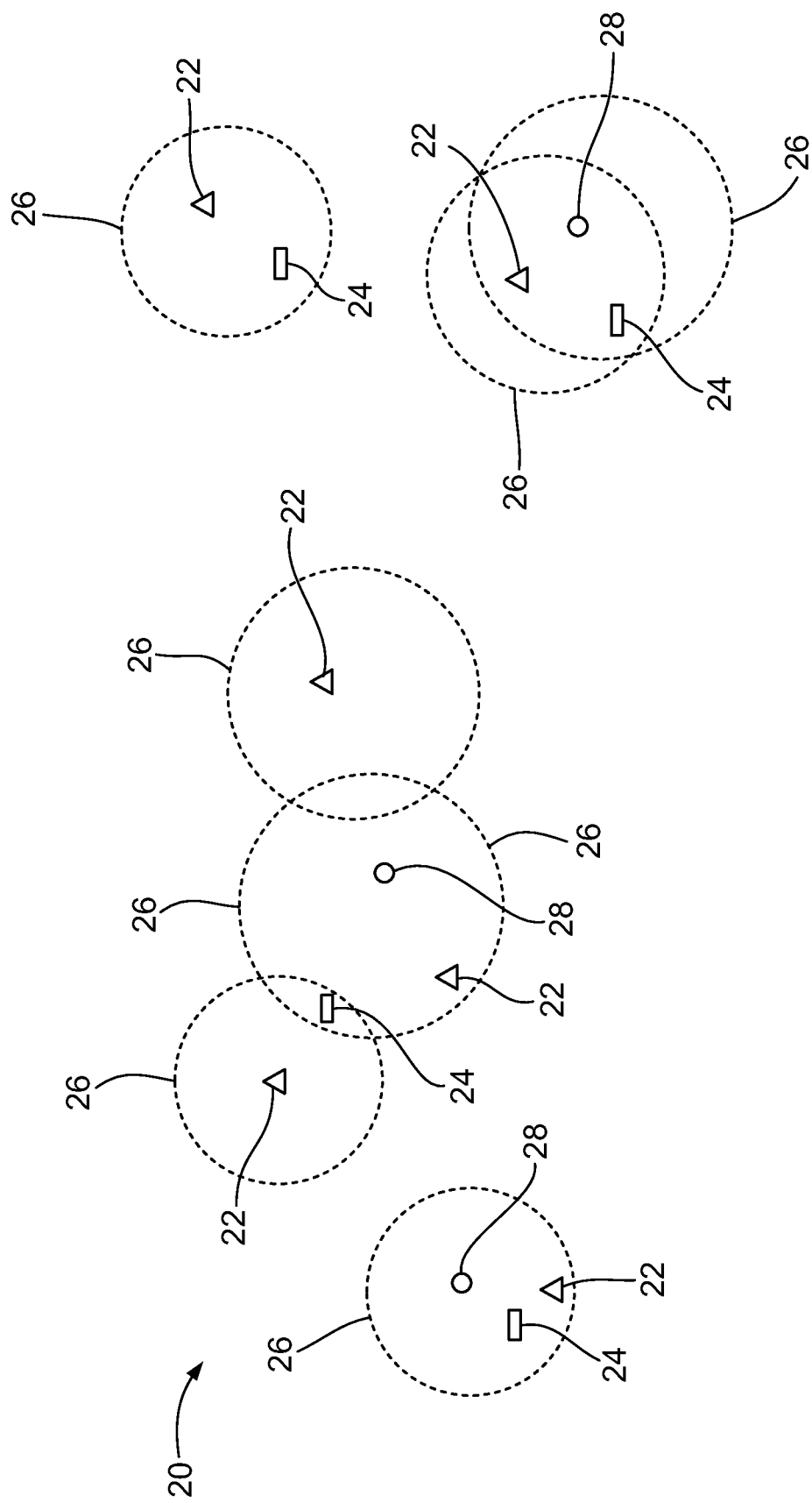
FIG. 1 is a block diagram of a cellular communication system in which heartbeat signals may be generated in accordance with various embodiments of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between system components or hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of the present invention provide a method for generating heartbeat signals, which method may be performed automatically and dynamically. The generation of heartbeat signals may be provided at different rates. Accordingly, lower rates of heartbeat signals may be used at certain times, which reduces network traffic and can save battery life of a communication device, for example, a cellular telephone or a land mobile radio (LMR). As used herein, the term heartbeat signal generally refers to any signal generated by a device to maintain a network connection or channel. Further, as user herein, the term dynamic or dynamically generating refers to generating, for example, heartbeats at different rates based on changing conditions or other factors. Thus, dynamically generating generally can include changing or modifying the rate of generating heartbeats based on certain conditions or factors and which dynamic change may be provided automatically. However, the dynamic generation may include changing the rate of heartbeat generation for any reason, such as based on a preset profile, a predetermined time period, etc.

The various embodiments may generate heartbeat signals in different types of communication systems such as a cellular communication system 20 as shown in FIG. 1. The cellular communication system 20 includes a plurality of cellular data network base stations 22 and a plurality of voice servers 24. It should be noted that the voice servers 24 may be controlled by a main voice server (not shown), such as a Voice Network Interface Controller (VNIC) server. Also, the voice servers 24 are shown to indicate that the voice servers 24 may be associated at different times with different cells and in one embodiment the voice servers are physically located at a central data center (not shown). Each of the plurality of cellular data network base stations 22 have a corresponding cellular data network communication coverage area 26 (also referred to as a communication cell or cell). The cellular data network communication coverage areas 26 may be overlapping at some locations.

The various embodiments of the invention as described herein allow one or more communication units, for example, a user equipment (UE) 28 or other portable communication device to communicate with other UEs 28, such as using a shared channel (e.g., data packet channel) of the cellular communication system and maintain the connection to that channel by generating heartbeat signals. The UEs 28 may be, for example, land mobile radios configured to communicate over a General Packet Radio Service (GPRS) system by transmitting and receiving cellular data communication packets.

Figure 2:
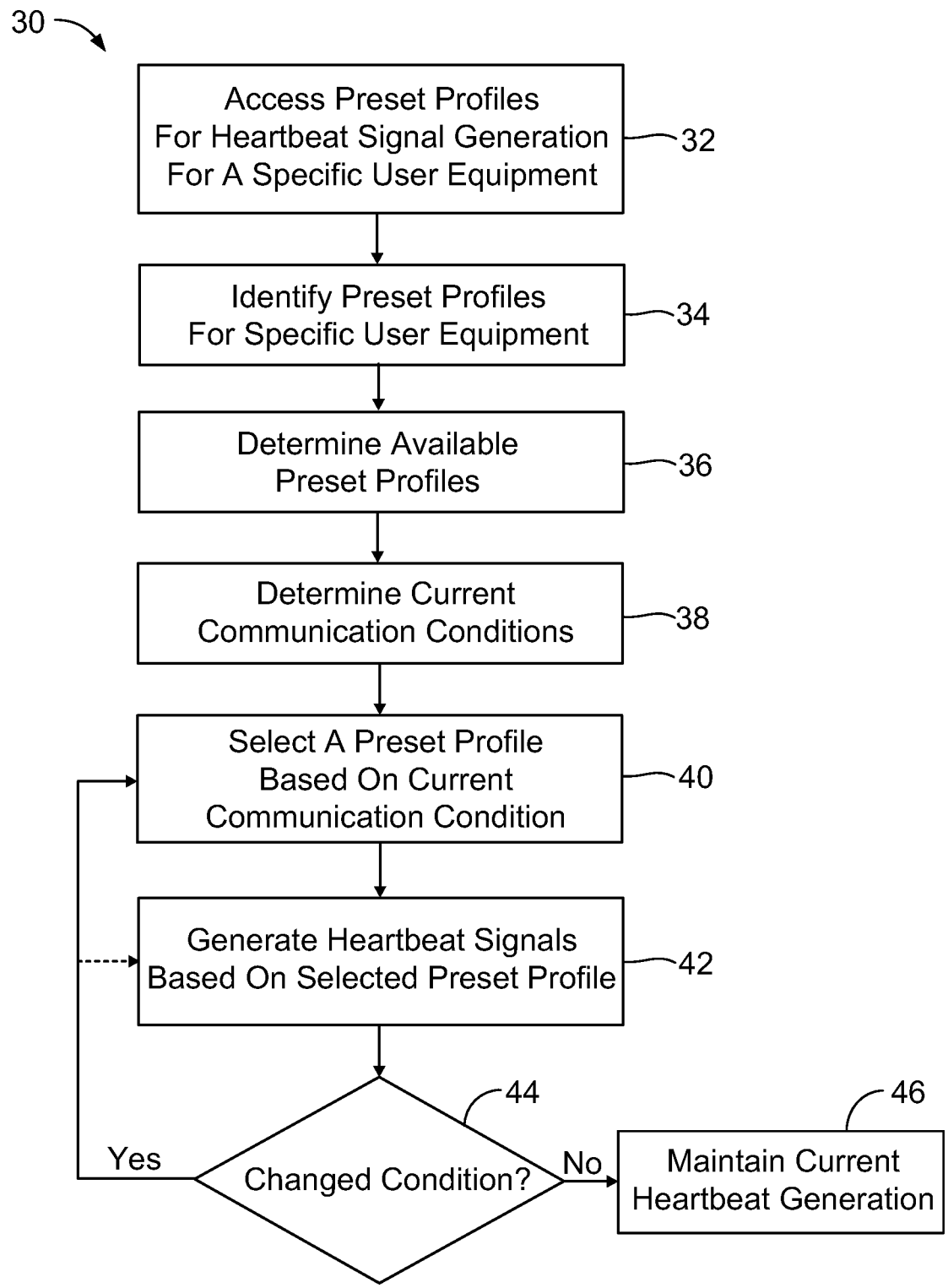
FIG. 2 is a flowchart of a method for automated and dynamic heartbeat signal generation in accordance with various embodiments of the invention.

A method 30 for heartbeat signal generation, for example automated and dynamic heartbeat signal generation, is shown in FIG. 2. The method 30 can adjust the rate at which heartbeat signals are generated. More particularly, at 32 one or more preset profiles for heartbeat signal generation for a particular user equipment, for example, for a particular user device are accessed. The preset profiles may be resident on the user device (e.g., preloaded in a memory of the user device) or on the network (e.g., stored within a server of a network). Optionally, periodic updates to the user device may include updating the preset profiles. The preset profiles may be different algorithms for generating heartbeat signals, which may be varied. After the preset profiles are accessed, the different preset profiles are identified at 34, which include identifying specific characteristics, requirements or conditions for each of the profiles. For example, the specific requirements (e.g., type of service available to the user device) or conditions (e.g., time and location conditions of the user device) for initializing and executing the different preset profiles may be identified.

Based upon the identification at 34, a determination is made at 36 as to preset profiles currently available. For example, certain preset profiles may only be available for a subscription (or fee) or may only be available to a particular user associated with the user device. Thereafter, current communication conditions are determined at 38. The determination may include, for example, the current congestion level of the network, the location of the user device, the time of day, priority levels, etc.

Is described in co-pending application—incorporate by reference

After the current communication conditions are determined at 38, a preset profile based on the determined communication conditions is selected at 40. For example, an algorithm for generating heartbeat signals associated with a preset profile is selected. The preset profile may define one or more frequencies, which may be variable, at which heartbeat signals are generated. Thereafter, heartbeat signals are generated at 42 based on the selected present profile. In particular, the particular user device generates heartbeat signals based on a program, procedure, algorithm, etc. as defined by the selected user profile.

A determination is then made at 44 as to whether communication conditions have changed. If the communication conditions have not changed then the current heartbeat generation based on the selected preset profile is maintained. However, if a determination is made at 44 that the communication conditions have changed, then depending on the type of change, either a new preset profile is selected at 40 or heartbeat signals are generated based on the selected preset profile, which heartbeat signals may be varied in frequency from a previous heartbeat generation frequency.

Thus, a method for generating heartbeat signals, and more particularly, an automated (e.g., automatically performed) and dynamic method for generating heartbeat signals is provided. Various embodiments and examples of different preset profiles will now be described. However, it should be noted that the various embodiments are not limited to the examples described below and variations/modifications are contemplated. Accordingly, the various embodiments provide for any automated and/or dynamic change in the generation of heartbeat signals such as the frequency or rate of generation of the heartbeat signals. It should be noted that although reference is made herein to preset profiles, the various embodiments are not limited to preset profiles. For example, any type of process or procedure may be implemented to generate heartbeat signals according to the various embodiments.

In one embodiment, a preset profile generates heartbeat signals during a period of time based on data link retention settings of the wireless system. For example, typically a system setting defines a predetermined number of heartbeats (e.g., two heartbeats) per cycle to maintain the current system data link access state, such as to maintain the current connection to a packet data connection. Accordingly, the preset profile is configured to generate heartbeat signals at the required number per cycle. It should be noted that there may be more heartbeat signals added for redundancy to avoid packets being lost. In certain situations, the predetermined number may be changed such as when the system has a high traffic load on the data link and where the system can request users or selects users to reduce the heartbeat signal rate and/or to not send redundant heartbeat signals to lower network traffic and/or increase a device's battery life. Thus, in this embodiment, a system threshold setting is linked to a generated heartbeat signal rate.

In another embodiment, a preset profile is capable of generating heartbeat signals on both an uplink connection and a downlink connection, and the heartbeat signals may be generated at different rates on each link. For example, a system typically requests devices to send heartbeat signals at a predefined rate. The sending of heartbeat signals on the downlink maintains the connection between the device and decreases the access time to the network for the device. In this embodiment, the heartbeat signal rate on the downlink may be different than the heartbeat signal rate on the uplink. For example, the heartbeat generation rate for downlink connection may be higher or lower than the heartbeat generation rate for the uplink connection.

Figure 3:
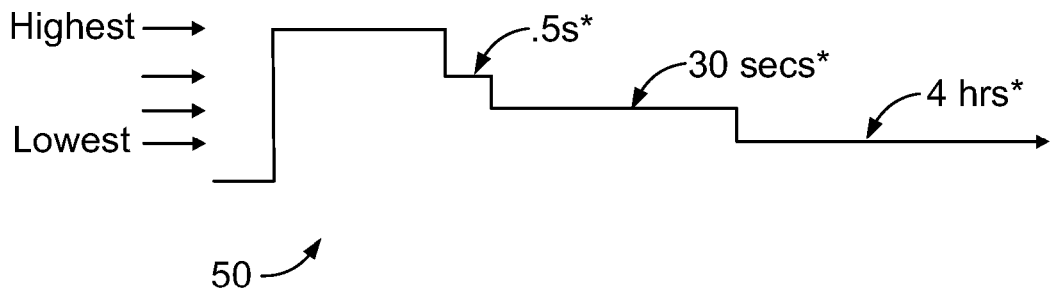
FIG. 3 is a graph illustrating a variable heartbeat signal generated waveform based on a readiness level to send data in accordance with various embodiments of the invention.

In another embodiment, a preset profile changes the generation rate of the heartbeat signals based on a desired or required transmission readiness level. For example, as shown by the variable heartbeat signal generation waveform 50 in FIG. 3, depending on a required or desired readiness level to send data, the generation rate for the heartbeat signals is modified. In particular, as the heartbeat rates are extended, the negotiated device state is altered, which affects the latency or response time, for example, of a push-to-talk (PTT) function of the communication device. Thus, as a required or desired readiness level increases (e.g., faster access time), the rate of generation of heartbeat pulses may increase. Accordingly, an intelligent or adaptive heartbeat generation rate is provided. It should be noted that different profiles for different network situations may be added to the system and/or device to allow for a more intelligent or dynamic heartbeat generation and sending behavior. For example, during network congestion, heartbeat rates may be based on a comparison with a system restart event where all devices will recycle at a similar time as described in more detail herein.

In another embodiment, a preset profile changes the heartbeat rate based on a location of the communication device. For example, the heartbeat rate may be changed based on a communication cell ID from which the communication device is transmitting. However, any information may be used to determine the location of the communication device. For example, preset profiles or algorithms may be provided to the system and/or device to allow for dynamic heartbeat signal generation or sending behavior. Accordingly, the change in heartbeat rate or preset profile may be based on a location coverage area. As an example, network congestion in certain areas may be more predominant and a different heartbeat rate or preset profile can be defined and used as compared with a less congested area.

In another embodiment, a preset profile randomizes the heartbeat rate to allow spreading of network traffic over time. For example, in the case where a system restarts, the system may request some or all connected devices to restart. If such a restart occurs for a plurality of devices at the same time (broadcast or multicast to devices) then the heartbeat signals may occur at the same time, resulting in a concentration of traffic at periodic intervals and an unacceptable traffic rate. Accordingly, in this embodiment, after a system restart, heartbeat rates are randomized during different time periods. For example, the heartbeat rates may be randomized for a first time period after a system reset. This randomization may be for one device or for several different devices. The various embodiments may provide a heartbeat that includes a random component. For example, on average, ninety percent of the heartbeat interval may be fixed and ten percent may be fixed.

In another embodiment, a preset profile changes the heartbeat rate based on historical network behavior. For example, at certain times during the day, week or year(s) network congestion may be more predominant and a different heartbeat rate used at these times compared with other times/dates. Thus, the heartbeat rate is varied based on time or date having historically more or less congested communication traffic (e.g., during rush hour or late at night). However, it should be noted that the varied heartbeat rates may be based on other historical network behaviors or information, such as certain data traffic trends, etc.

In another embodiment, a preset profile changes the heartbeat rate based on historical user behavior. For example, one user may have a tendency to make many PTT calls in a row or is known to make multiple successive calls during a particular time of day. Accordingly, this preset profile allows the user's device to send heartbeat signals following each of the calls to retain the data link (e.g., packet data link) and thereby improve performance. However, a user whose PTT calls are historically more dispersed may not be required to be provisioned at such a high heartbeat rate following the end of a PTT call. Accordingly, the heartbeat rate may not be changed based on user behavior.

Thus, for a user that historically makes at least one call shortly after ending another call, this preset profile continues to send heartbeat signals at a rate that retains a high speed communication connection for a longer period of time to avoid dropping from the high speed connection, which would result in delay when having to reconnect to the high speed connection. For example, after a call, the heartbeat signal generation may remain at a higher level to maintain the high speed connection for a predetermined time period, such as five seconds. Thereafter, if no call is initiated, the heartbeat rate is lowered such that the high speed connection is terminated.

In another embodiment, a preset profile changes the heartbeat rate based on a service priority. For example, based on the type of required or desired service (e.g., standard or premium) the heartbeat rate may be changed. Accordingly, for police communication units, especially during emergencies, or users that pay for premium service, the heartbeat rate is increased. In contrast, and for example, for standard uses, such as taxi cab communications or prepaid service, the heartbeat rate is decreased or maintained at a lower rate than the rate for emergency services. Thus, multiple thresholds for multiple users may be used to determine different heartbeat rates.

In another embodiment, a preset profile changes the heartbeat rate based on user groups. For example, one group, such as paramedics, special police forces, etc. may require a low latency response on a PTT system. Communication devices for these types of groups may be set at a higher heartbeat generation rate. For other groups, such as personal groups, traffic patrol police, etc. higher latency may be acceptable. Communication devices for these types of groups may be set at a lower heartbeat generation rate. Thus, the heartbeat rate may be determined or changed based on groups defined by particular users.

Figure 4:
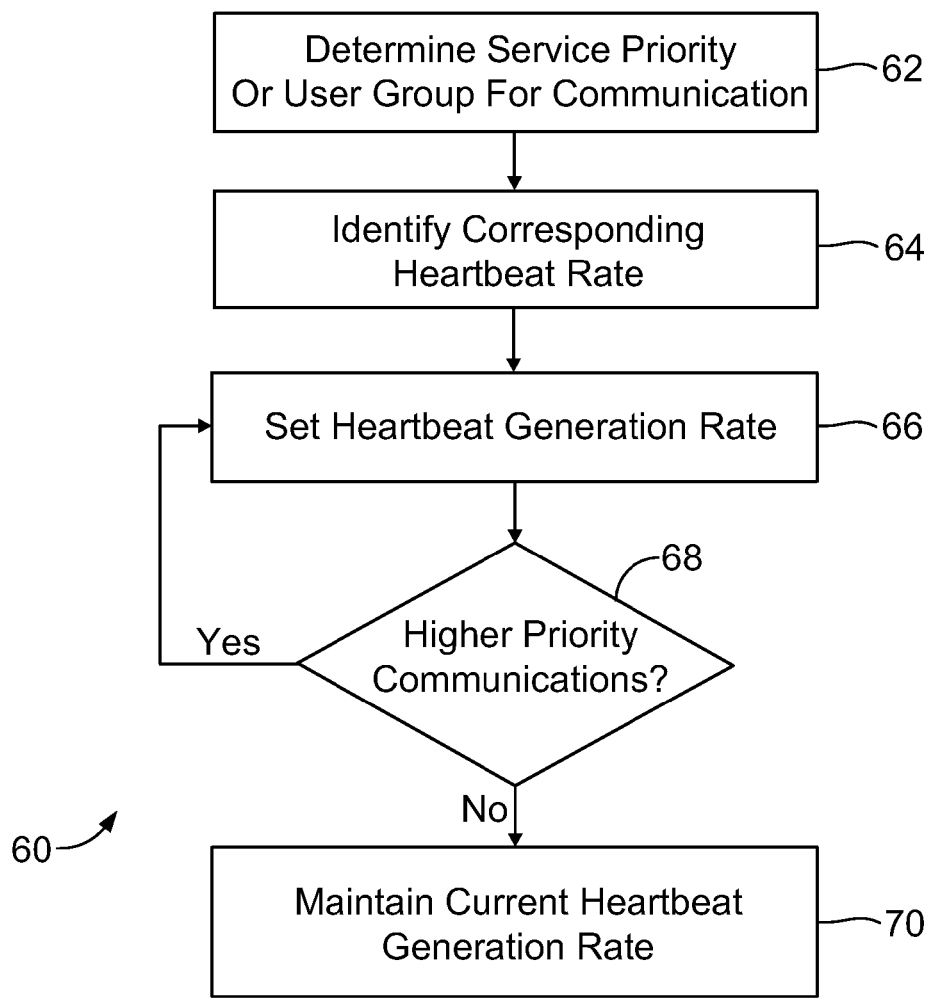
FIG. 4 is a flowchart of a method for setting heartbeat rates based on service priority or user groups in accordance with various embodiments of the invention.

Accordingly, with respect to a preset profile that changes the heartbeat rate based on service priority or user groups, a method 60 a shown in FIG. 4 may be provided. The method 60 includes determining one of a service priority or user group information for one or more communications at 62. For example, a determination may be made as to a service priority or group priority for users communicating within a communication cell. The results of the determination may be a list of users sorted by service priority or group priority. Thereafter, a corresponding heartbeat rate, and in particular, a corresponding heartbeat generation rate for different users within the communication cell are determined. The determination may be based on the preset profile for each of the service priorities or user groups.

The heartbeat generation rate for each of the users is set at 66. In particular, a heartbeat generation rate for the communication device (e.g., LMR) for each user is thereafter set. For example, different connection states (e.g., high speed connection, low speed connection, etc.) may be associated with the users based on the identified service priorities or user groups and a corresponding heartbeat generation rate set accordingly. Thus, for higher priority calls (e.g., emergency calls or premium service) the heartbeat generation rate is set to a higher level to maintain a high speed connection and for lower priority calls the heartbeat generation rate is set to a lower level such that a high speed connection is not necessarily maintained or is not maintained. It should be noted that the setting of the heartbeat generation rate for each communication device may be performed independently without consideration of the other communication devices within the communication cell or may be performed with consideration given to the other communication devices. For example, some users' connection may be degraded by lowering the heartbeat generation rate when bandwidth is needed for higher priority communications for which the heartbeat generation rate is set to maintain high speed connections.

Thus, a determination then may be made at 68 whether higher priority communications are now present in the communication cell. If no higher priority communications are present within the communication cell, then at 70 the current heartbeat generation rate for all communication devices is maintained. If there is a change is the priority communications, such as new emergency connections within the communication cell or some communications become emergency calls, then the heartbeat generation rates are again set (or changed) at 66.

In another embodiment, a preset profile changes the heartbeat rate based on a data bearer. For example, the heartbeat rate may be based on a particular protocol or network standard with which a communication device is communicating. For example, a dual mode device supporting WiFi and a cellular communication standard may generate a different heartbeat rate depending on the bearer of the PTT application information. The heartbeat rate may be changed from sending heartbeats to not sending heartbeats or from sending heartbeats at a higher rate to sending heartbeats at a lower rate based on a protocol or standard for a network connection, which may change, such as when a mobile device travels through different communication cells that may be serviced by different networks.

It should be noted that the various embodiments are not limited to any particular network. For example, the various embodiments may be implemented in connection with different cellular networks, such as an Enhanced Data Rates for GSM Evolution (EDGE) network, a Code Division Multiple Access (CDMA) network, a Universal Mobile Telecommunications System (UMTS) network, a Wideband Code Division Multiple Access (W-CDMA) network, a General Packet Radio Service (GPRS) network, or generally any 2G, 3G or 4G cellular network.

Figure 5:
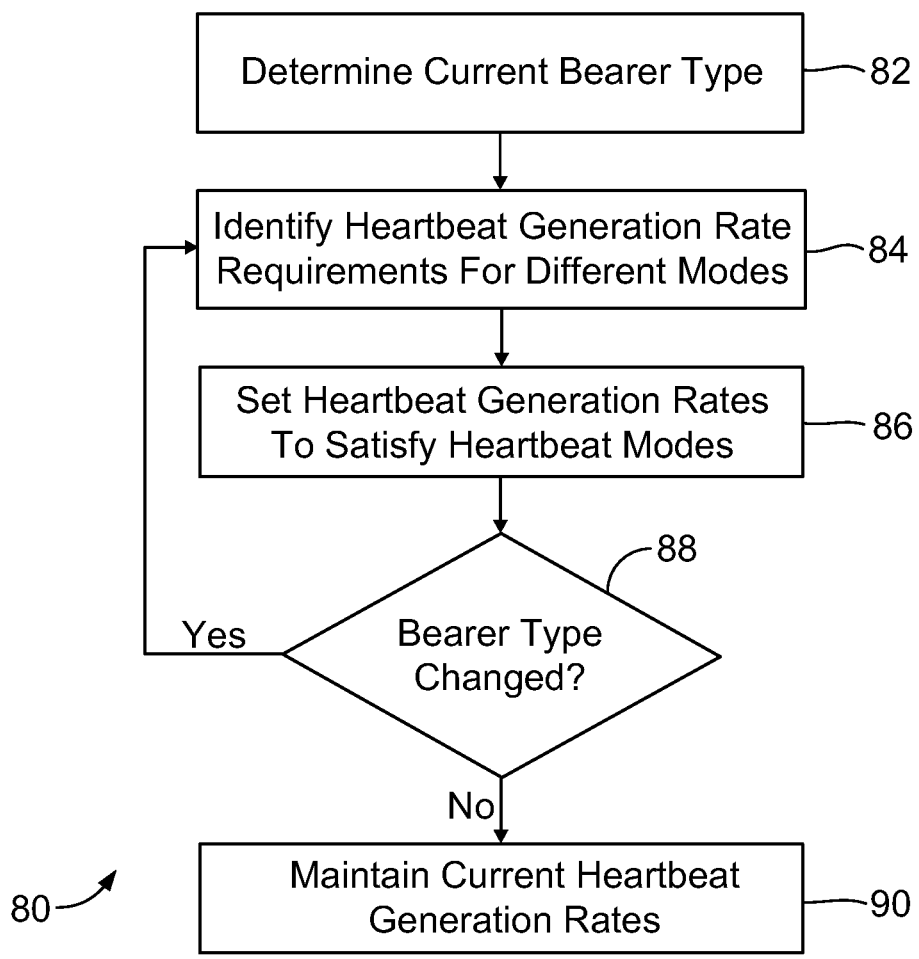
FIG. 5 is a flowchart of a method for setting heartbeat rates based on a data bearer type in accordance with various embodiments of the invention.

Accordingly, with respect to a preset profile that changes based on a data bearer, a method 80 as shown in FIG. 5 may be provided. The method 80 includes determining a current bearer type at 82. For example, a current network type or protocol is determined, which may be that a mobile communication device (e.g., a portable LMR unit) is in a communication cell providing W-CDMA communication. Thereafter, heartbeat generation rate requirements or preset profiles for the particular network protocol are identified at 84. For example, in a W-CDMA network communication cell, a plurality of different heartbeat generation requirements are identified including a battery save/shared bandwidth heartbeat generation mode, an end call heartbeat generation mode, a listening heartbeat generation mode and an extended duration heartbeat generation mode. For each of these heartbeat generation modes, different heartbeat generation rates are required or may be defined. The below listed generation rates are provided for illustrative purposes only and different values may be used. Accordingly, and for example, in the battery save/shared bandwidth mode, different heartbeat rates may be provided as follows:

Retain in non-idle state: Heartbeat signal generated every 30 minutes.
Battery saving state: Heartbeat signal generated every 10 minutes.
Shared channel state: Heartbeat signal generated every 10 seconds.

In the end call heartbeat generation mode different heartbeat rates may be provided as follows:

Immediately following call: Heartbeat signal generated to maintain high speed connection (e.g., every 1-2 seconds).
After predetermined time period following call (5-10 seconds after call): Heartbeat signal generated every 10 seconds to maintain shared channel.

In the listening heartbeat generation mode a heartbeat rate may be provided as follows:

No data/voice communicated during an active call: Heartbeat signal generated every 20 seconds or a predetermined time period prior to the connection being dropped (e.g., one half of the time period for high speed connection call drop).

In the extended duration heartbeat generation mode a heartbeat rate may be provided as follows:

No data/voice communicated for 24 hours: Heartbeat signal generated every 8 hours (e.g., one third of the time period for losing the context connection).

It should be noted that the various rates for the heartbeat signal generation may be varied for different W-CDMA systems.

Referring again to the method 80, heartbeat generation rates are set to satisfy the rates identified for each mode. A determination also may be made as to a current mode of the communication device and the heartbeat rate set accordingly. For example, if the communication device is in a battery save/shared bandwidth mode, the heartbeat signals are generated to save battery power or maintain a shared bandwidth as described in more detail above.

Thereafter, a determination is made at 88 as to whether the bearer type has changed. For example, a determination is made as to whether the network type or protocol has changed as a result of the communication device moving into a different communication cell. If the communication device is still in the same communication cell or has moved to another communication cell with the same network type or protocol, the current heartbeat generation rates are maintained at 90. However, if the communication device has moved to another communication cell having a different network type or protocol or if the network type or protocol has changed in the current communication cell, heartbeat generation rate requirements for different modes are determined at 84. For example, if the communication device moves from a communication cell communicating using W-CDMA to a communication cell communicating using EDGE, then different heartbeat generation rates may be defined, certain modes removed or certain modes added. For example, when moving from a W-CDMA communication cell to an EDGE communication cell, the battery save/shared bandwidth mode is removed.

It should be noted that other variable or dynamic heartbeat rates may be provided. For example, following communication timeouts (due to, for example, thresholds), the heartbeat rate and/or preset profile may be changed. Also, it should be noted that multiple levels of service with multiple different levels of rates of heartbeats also may be provided in the various embodiments. Additionally, the various embodiments, such as the various preset profiles may be combined to include some or all of the different profiles.

Thus, various embodiments provide automated/automatic and/or dynamic heartbeat signal generation.

The various embodiments or components, for example, the cellular communication system or communication devices, or controllers therein, may be implemented as part of one or more computer systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wireless communication system comprising:
   a server; and
   a plurality of wireless communications devices in communication with said server and being organized in at least one device group with an associated service priority;
   each wireless communications device comprising a wireless transceiver, a memory having a plurality of heartbeat profiles stored therein, and a controller cooperating with said wireless transceiver and said memory, and configured to
      establish a channel having bandwidth for communication with said server and at least one other wireless communications device,
      determine at least one communication condition,
      select a heartbeat profile from the plurality of heartbeat profiles in said memory and based upon the at least one communication condition and a wireless communications device type, and
      keep alive the channel by transmitting a plurality of heartbeat signals to said server based upon the selected heartbeat profile and the respective service priority.

2. The wireless communication system according to claim 1 wherein said controller is configured to vary a rate of transmission of the plurality of heartbeat signals.

3. The wireless communication system according to claim 1 wherein each heartbeat profile defines at least one rate of heartbeat transmission based the at least one communication condition.

4. The wireless communication system according to claim 1 wherein the at least one communication condition comprises a data link retention characteristic.

5. The wireless communication system according to claim 1 wherein said controller is configured to transmit the plurality of heartbeat signals at a different rate for each of an uplink communication and a downlink communication.

6. The wireless communication system according to claim 1 wherein the at least one communication condition comprises a transmission readiness level.

7. The wireless communication system according to claim 1 wherein the at least one communication condition comprises a device location.

8. The wireless communication system according to claim 1 wherein said controller is configured to transmit the plurality of heartbeat signals at a random rate.

9. The wireless communication system according to claim 1 wherein the at least one communication condition comprises a historical network behavior characteristic.

10. The wireless communication system according to claim 1 wherein the at least one communication condition comprises a historical user behavior characteristic.

11. The wireless communication system according to claim 1 wherein said controller is configured to determine a different service priority based upon a type of service and a priority level of a respective communication.

12. The wireless communication system according to claim 1 wherein the at least one communication condition comprises a data bearer characteristic.

13. The wireless communication system according to claim 12 wherein said controller is configured to generate the data bearer characteristic based upon a network type of a communication cell.

14. A wireless communications device in communication with a server, and a plurality of other wireless communications devices organized in at least one device group with an associated service priority, the wireless communications device comprising:
   a wireless transceiver;
   a memory configured to store a plurality of heartbeat profiles therein; and
   a controller cooperating with said wireless transceiver and said memory, and configured to
      establish a channel having bandwidth for communication with said server and at least one other wireless communications device,
      determine at least one communication condition,
      select a heartbeat profile from the plurality of heartbeat profiles in said memory and based upon the at least one communication condition and a wireless communications device type, and
      keep alive the channel by transmitting a plurality of heartbeat signals to said server based upon the selected heartbeat profile and the respective service priority.

15. The wireless communications device according to claim 14 wherein said controller is configured to vary a rate of transmission of the plurality of heartbeat signals.

16. The wireless communications device according to claim 14 wherein each heartbeat profile defines at least one rate of heartbeat transmission based the at least one communication condition.

17. The wireless communications device according to claim 14 wherein the at least one communication condition comprises a data link retention characteristic.

18. The wireless communications device according to claim 14 wherein said controller is configured to transmit the plurality of heartbeat signals at a different rate for each of an uplink communication and a downlink communication.

19. The wireless communications device according to claim 14 wherein the at least one communication condition comprises a transmission readiness level.

20. A method of operating a wireless communications device in communication with a server, and a plurality of other wireless communications devices being organized in at least one device group with an associated service priority, the method comprising:
   establishing a channel having bandwidth for communication with the server and at least one other wireless communications device;
   determining at least one communication condition;
   selecting a heartbeat profile from a plurality of heartbeat profiles stored in a memory of the at least one other wireless communications device and based upon the at least one communication condition and a wireless communications device type; and
   keeping alive the channel by transmitting a plurality of heartbeat signals to the server based upon the selected heartbeat profile and the respective service priority.

21. The method according to claim 20 further comprising varying a rate of transmission of the plurality of heartbeat signals.

22. The method according to claim 20 wherein each heartbeat profile defines at least one rate of heartbeat transmission based the at least one communication condition.

23. The method according to claim 20 wherein the at least one communication condition comprises a data link retention characteristic.

24. The method according to claim 20 further comprising transmitting the plurality of heartbeat signals at a different rate for each of an uplink communication and a downlink communication.

25. The method according to claim 20 wherein the at least one communication condition comprises a transmission readiness level.

* * * * *